(12) United States Patent
Raykova et al.

(10) Patent No.: US 8,756,410 B2
(45) Date of Patent: Jun. 17, 2014

(54) POLYNOMIAL EVALUATION DELEGATION

(75) Inventors: Mariana Raykova, New York, NY (US); Seny F. Kamara, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 12/963,400

(22) Filed: Dec. 8, 2010

(65) Prior Publication Data

US 2012/0151205 A1 Jun. 14, 2012

(51) Int. Cl.
| | |
|---|---|
| G06F 7/04 | (2006.01) |
| G06F 17/30 | (2006.01) |
| H04N 7/16 | (2011.01) |
| H04K 1/00 | (2006.01) |
| H04L 9/00 | (2006.01) |
| H04L 9/28 | (2006.01) |
| H04L 29/06 | (2006.01) |

(52) U.S. Cl.
USPC .............................. 713/150; 380/28; 726/27

(58) Field of Classification Search
USPC ...................... 380/28–30; 713/150, 153, 189, 713/193–194; 726/26–29
See application file for complete search history.

(56) References Cited

U.S. PATENT DOCUMENTS

| | | | |
|---|---|---|---|
| 8,225,106 B2 | 7/2012 | Mattsson | |
| 2005/0005286 A1 | 1/2005 | Koskela et al. | |
| 2008/0098370 A1 | 4/2008 | Fontoura et al. | |
| 2010/0046740 A1* | 2/2010 | Schneider | 380/28 |
| 2010/0169328 A1 | 7/2010 | Hangartner | |
| 2010/0179855 A1 | 7/2010 | Chen et al. | |

OTHER PUBLICATIONS

Menezes et al., Handbook of Applied Cryptography, 1997, CRC Press LLC, pp. 525-526.*
Dachman-Soled et al., Efficient Robust Private Set Intersection, 2009, pp. 125-142.*
Dean et al., MapReduce: Simplified Data Processing on Large Clusters, 2008, pp. 107-113.*
Ricardo Xavier Sanchez DelCastillo, Secure Delegation of Computing and Data in Unsafe Distributed Systems, 1999, pp. 19-40 and 45-65.*
Notice of Allowance, U.S. Appl. No. 12/961,805, filed Dec. 7, 2010, Date Mailed: Oct. 5, 2012, pp. 16.

(Continued)

*Primary Examiner* — Philip Chea
*Assistant Examiner* — Trong Nguyen
(74) *Attorney, Agent, or Firm* — Dan Choi; Carole Boelitz; Micky Minhas (57) ABSTRACT

Shares for one or more data values in a dataset can be computed using evaluation point values and sharing polynomials. Lagrangian coefficients can also be computed for the evaluation point values. The shares and the Lagrangian coefficients may be used to evaluate the polynomials on the data values. The technique can also include encrypting the Lagrangian coefficients according to an encryption scheme that provides for addition operations between encrypted values. An operation on representations of coefficients of the evaluation polynomial, representations of the shares, and the encrypted representations of the Lagrangian coefficients can be delegated to a remote computing environment. The operation can be performed at the remote computing environment, such as by performing a map-reduce operation. Results of the delegated operation can be received from the remote computing environment and processed to produce representation(s) of evaluation(s) of the polynomial on the data value(s).

20 Claims, 5 Drawing Sheets

(56) References Cited

OTHER PUBLICATIONS

"Amazon Web Services: Overview of Security Processes", Retrieved at << http://awsmedia.s3.amazonaws.com/pdf/AWS_Security_Whitepaper.pdf >>, Aug. 2010, pp. 1-22.

Wei, et al "SecureMR: A Service Integrity Assurance Framework for MapReduce", Retrieved at << http://ieeexplore.ieee.org/stamp/stamp.jsp?tp=&arnumber=5380520 >>, 2009, pp. 73-82.

Roy, et al., "Airavat: Security and Privacy for MapReduce", Retrieved at << http://www.usenix.org/event/nsdi10/tech/full_papers/roy.pdf >>, Networked Systems Design and Implementation—NSDI 2010, pp. 1-16.

Zhou, et al., "Towards Secure Cloud Data Management", Retrieved at << http://netdb.cis.upenn.edu/papers/ds2_socc10.pdf >>, Feb. 2010, pp. 1-6.

Yang, et al., "Osprey: Implementing MapReduce-Style Fault Tolerance in a Shared-Nothing Distributed Database", Retrieved at << http://db.csail.mit.edu/pubs/paper.pdf >>, Data Engineering (ICDE), 2010 IEEE 26th International Conference, Mar. 1-6, 2010, pp. 12.

"Amazon Elastic MapReduce", Retrieved at << http://aws.amazon.com/elasticmapreduce >>, Retrieved Nov. 15, 2010, pp. 7.

Afrati, et al., "A New Computation Model for Cluster Computing", Retrieved at << http://infolab.stanford.edu/~ullman/pub/mapred-model-report.pdf >>, Dec. 30, 2009, pp. 1-26.

Canetti, et al., "Security and Composition of Multi-Party Cryptographic Protocol", Retrieved at << http://citeseerx.ist.psu.edu/viewdoc/download?doi=10.1.1.21.4870&rep=rep1&type=pdf >>, Sep. 9, 1999, pp. 1-56.

Chierichetti, et al., "Max-Cover in Map-Reduce", Retrieved at << http://www.tomkinshome.com/site_media/papers/papers/CKT10a.pdf >>, Apr. 26-30, 2010, pp. 10.

Chu, et al., "Map-Reduce for Machine Learning on Multicore", Retrieved at << http://www.cs.stanford.edu/people/ang/papers/nips06-mapreducemulticore.pdf >>, In NIPS, 2006, pp. 8.

Das, et al., "Google News Personalization: Scalable Online Collaborative Filtering", Retrieved at << http://www2007.org/papers/paper570.pdf >>, May 8-12, 2007, pp. 271-280.

Dean, et al., "Map Reduce: Simplified Data Processing on Large Clusters", Retrieved at << http://static.googleusercontent.com/external_content/untrusted_dlcp/labs.google.com/en//papers/mapreduce-osdi04.pdf >>, In OSDI'04: Proceedings of the 6th conference on Symposium on Opearting Systems Design & Implementation, 2004, pp. 1-13.

"Hadoop. Powered by hadoop.", Retrieved at << http://wiki.apache.org/hadoop/PoweredBy >>, Retrieved Date: Sep. 22, 2010, pp. 13.

Kang, et al., "PEGASUS: A Peta-Scale Graph Mining System Implementation and Observations", Retrieved at << http://citeseerx.ist.psu.edu/viewdoc/download?doi=10.1.1.156.764&rep=rep1&type=pdf >>, IEEE International Conference on Data Mining, 2009, pp. 10.

Karloff, et al., "A Model of Computation for Map Reduce", Retrieved at << http://research.yahoo.com/files/mrc.pdf >>, 2010, pp. 11.

Liu, et al., "Cloud MapReduce: A MapReduce implementation on Top of a Cloud Operating System", Retrieved at << http://aleph-i.com/papers/cloudmapreduce.pdf >>, Accessed on Sep. 22, 2010, pp. 1-14.

Lin, et al., "Design Patterns for Efficient Graph Algorithms in Map Reduce", Retrieved at << http://www.umiacs.umd.edu/~jimmylin/publications/Lin_Schatz_MLG2010.pdf >>, In MLG '10: Proceedings of the Eighth Workshop on Mining and Learning with Graphs, 2010, pp. 78-85.

Rao, et al., "Ranking and Semi-Supervised Classification on Large Scale Graphs Using Map-Reduce", Retrieved at << http://citeseerx.ist.psu.edu/viewdoc/download?doi=10.1.1.165.1182&rep=rep1&type=pdf >>, Proceedings of the 2009 Workshop on Graph-based Methods for Natural Language Processing, ACL-IJCNLP 2009, Aug. 7, 2009, pp. 16.

Shamir, Adi, "How to Share a Secret", Retrieved at << http://www.google.co.in/url?sa=t&source=web&cd=1&ved=0CBUQFjAA&url=http%3A%2F%2Fciteseerx.ist.psu.edu%2Fviewdoc%2Fdownload%3Fdoi%3D10.1.1.80.8910%26rep%3Drep1%26type%3Dpdf&ei=o9GZTPL2L8Srcem-1NkH&usg=AFQjCNEPZXfq5Qp-_4ngcjy5z-1H2iy3bA >>, 1979, pp. 612-613.

"Airavat: Improved Security for MapReduce", , Retrieved at << http:www.cs.utexas.edu/~indrajit/airavat.html >>, Retrieved on Oct. 20, 2010, pp. 2.

Zhu, et al., "Private Searching on MapReduce", TrustBus 2010, LNCS 6264, 2010, pp. 93-101.

"Cloudera: Apache Hadoop for Enterprise", Retrieved at << http://www.cloudera.com >>, Retrieved on Nov. 15, 2010, pp. 2.

"PoweredBy—Hadoop Wiki", Retrieved at << http://wiki.apache.org/hadoop/PoweredBy?action=print >>, Retrieved on Nov. 15, 2010, pp. 16.

Zowadny, Jeremy, "Yahoo! Launches World's Largest Hadoop Production Application", Retrieved at << http://developer.yahoo.com/blogs/hadoop/posts/2008/02/yahoo-worlds-largest-production-hadoop/ >>, Feb. 29, 2008, pp. 4.

Abadi, et al., "On Hiding Information from an Oracle", 1989, pp. 1-29.

Applebaum, et al., "From Secrecy to Soundness: Efficient Verification via Secure Computation", Automata, Languages and Programming—ICALP 2010, pp. 12.

Boneh, et al., "Evaluating 2-DNF Formulas on Ciphertexts", Apr. 2, 2006, pp. 1-16.

Chung, et al., "Improved Delegation of Computation using Fully Homomorphic Encryption", Apr. 28, 2010, pp. 28.

Culler, et al., "LogP: A Practical Model of Parallel Computation", vol. 39, No. 11 Communications of the ACM, Nov. 1996, pp. 78-85.

Dachman-Soled, et al., "Efficient Robust Private Set Intersection", ACNS 2009, LNCS 5536, 2009, pp. 125-142.

Dean, et al., "MapReduce: Simplified Data Processing on Large Clusters", Communications of the ACM vol. 51, No. 1, Jan. 2008, pp. 107-113.

Fortnow, et al., "Interactive Proof Systems and Alternating Time-Space Complexity", Symposium on Theoretical Aspects of Computer Science—STACS 1991, pp. 1-23.

Fortune, et al., "Parallelism in Random Access Machines", STOC '78 Proceedings of the tenth annual ACM symposium on Theory of computing, 1978, pp. 114-118.

Gennaro, et al., "Non-Interactive Verifiable Computing: Outsourcing Computation to Untrusted Workers", Feb. 1, 2010, pp. 1-19.

Gentry, Craig, "Fully Homomorphic Encryption Using Ideal Lattices", STOC'09, May 31-Jun. 2, 2009, pp. 169-178.

Gentry, et al. "A Simple BGN-type Cryptosystem from LWE", Mar. 30, 2010, pp. 1-15.

Goldwasser, et al., "Delegating Computation: Interactive Proofs for Muggles", STOC'08, May 17-20, 2008, pp. 10.

Isard, et al., "Dryad: Distributed Data-Parallel Programs from Sequential Building Blocks", EuroSys'07, Mar. 21-23, 2007, pp. 14.

Ishai, et al., "Cryptography from Anonymity", Proceedings of the 47th Annual IEEE Symposium on Foundations of Computer Science (FOCS'06), 2006, pp. 10.

Katz, et al., "Predicate Encryption Supporting Disjunctions, Polynomial Equations, and Inner Products", Advances in Cryptology—Eurocrypt 2008 in Advances in Cryptology—Eurocrypt 2008 , vol. 4965 (2008), pp. 146-162.

Lund, et al., "Algebraic Methods for Interactive Proof Systems", 1992, pp. 1-10.

Micali, Silvio, "CS Proofs", IEEE, 1994, pp. 436-453.

Naor, Moni, "Oblivious Polynomial Evaluation", SIAM Journal on Computing—SIACOMP, 2006, pp. 1-31.

Shamir, Adi, "IP=SPACE", Journal of the Association for Computing Machinery, vol. 39. No. 4, Oct. 1992, pp. 869-877.

Shen, Emily, "Predicate Privacy in Encryption Systems", Dec. 24, 2008, pp. 1-33.

Yu, et al., "DryadLINQ: A system for General-Purpose Distributed Data-Parallel Computing Using a High-Level Language", 8th USENIX Symposium on Operating Systems Design and Implementation, Dec. 208, pp. 1-14.

"Amazon Elastic Map Reduce Getting Started Guide", Retrieved at << http://s3.amazonaws.com/awsdocs/ElasticMapReduce/latest/emr-gsg.pdf >>, Last Updated Nov. 12, 2010, pp. 38.

(56) References Cited

OTHER PUBLICATIONS

Beaver, et al., "Hiding Instances in Multioracle Queries", Symposium on Theoretical aspects of Computer Science (STACS '90), 1990, pp. 37-48.
Valiant, Leslie, A Bridging Model for Parallel Computation, Communications of the ACM, vol. 33, No. 8, Aug. 1990, pp. 103-111.
Raykova, et al., "Counting Delegation Using Hidden Vector Encryption", U.S. Appl. No. 12/961,805, filed Dec. 7, 2010, pp. 1-33 and Drawing Sheets 1-5.
"Homomorphic Encryption", Wikipedia, Retrieved at <<http://en.wikipedia.org/wiki/Homomorphic_encryption>>. Retrieved Date: Oct. 24, 2013, 6 Pages.

* cited by examiner

POLYNOMIAL EVALUATION DELEGATION

BACKGROUND

A map-reduce framework defines a computational model that can be used to design and implement parallel processing techniques on computer clusters, such as large-scale distributed systems. While the term "MapReduce" is often used to describe such a framework, the term "map-reduce" (without capital letters) is used herein to clarify that reference is not being made to any particular implementation. A map-reduce operation is an operation performed according to the map-reduce framework. A map-reduce operation includes a mapping operation that includes multiple individual operations that can be distributed across multiple computing environments (mappers) and performed in parallel. Each individual mapping operation takes one or more input label-value pairs and outputs one or more intermediate label-value pairs. The map-reduce operation typically also includes a partition operation that takes one or more intermediate pairs and defines a partition of intermediate values. Additionally, the map-reduce operation includes a reduce operation that can include multiple individual reduce operations that can be distributed across multiple computing environments (reducers). The individual reduce operations each take an input label and a partition of intermediate values and outputs an output label-value pair. A map-reduce cluster is a computer cluster that is configured to run map-reduce operations according to the map-reduce framework.

Some computer cluster providers offer access to map-reduce computer clusters "as a service." This can allow a map-reduce program and associated data pairs to be delegated to a third-party's computer cluster by a data provider's cluster client. The computer cluster can run the map-reduce program on the data in the map-reduce cluster and return results to the data provider. Access to other computing environments (e.g., mainframe computers or computer clusters that are not using the map-reduce framework) may also be offered as a service.

SUMMARY

While delegation of processing computations to remote computing environments such as map-reduce clusters enables clients to utilize processing capabilities of such remote computing environments, data providers often must trust the provider of the remote computing environment with their data and data processing information. The tools and techniques described herein can allow delegation to a remote computing environment such as a map-reduce computer cluster of polynomial evaluation operations, where information sent to the cluster can be private (i.e., obscured using one or more techniques such as secret sharing, inclusion of noisy information, and/or one or more encryption techniques).

In one embodiment, the tools and techniques can include computing shares for one or more data values in a dataset using multiple evaluation point values and one or more secret sharing polynomials (i.e., polynomials that are configured to be used for generating secret sharing shares). The evaluation point values can include an initial evaluation point value and one or more subsequent evaluation point values (which may or may not be arranged in that order, e.g., the "initial" evaluation point may be ordered in the middle of "subsequent" evaluation points in a representation of the data points). For example, the evaluation points and secret sharing polynomial(s) can be such that an evaluation of each of the secret sharing polynomial(s) on the initial evaluation point value yields a corresponding data value from the dataset. Lagrangian coefficients (which are defined below in the Detailed Description section) can be computed for each of the subsequent evaluation point value(s) $\alpha_j$ evaluated on the initial evaluation point value $\alpha_0$, (i.e., $L_{\alpha_j}(\alpha_0)$, where L represents the Lagrangian coefficients). The shares and the Lagrangian coefficients can be used to evaluate polynomials on the data values. The technique can also include encrypting the Lagrangian coefficients according to an encryption scheme that provides for addition operations between encrypted values (described more in the following paragraph) to produce encrypted representations of the Lagrangian coefficients. An operation on representations of coefficients of an evaluation polynomial, representations of the shares, and the encrypted representations of the Lagrangian coefficients can be delegated to a remote computing environment (i.e., a computing environment outside a computing environment from which the delegation originates). Results of the delegated operation can be received from the remote computing environment, and the results can be processed to produce one or more representations of evaluation(s) of the polynomial on the data value(s).

An encryption scheme that provides for addition operations between encrypted values, as used herein, is an encryption scheme that allows an encryption key to be generated and used to encrypt values. In such encryption schemes that provide for addition operations between encrypted values, summing or addition operations (which are defined under the particular scheme and are typically more complex than simple summing operations on non-encrypted values) can be performed on the encrypted values to add encrypted values to each other and/or to non-encrypted values, thereby producing encrypted sums. Additionally, in some such encryption schemes other operations may be performed on the encrypted values, such as multiplication operations of encrypted values with non-encrypted values, or limited multiplication operations of encrypted values with other encrypted values. The encrypted values and the encrypted sums, products, etc. can be decrypted using the key. Examples of such encryption scheme that provides for addition operations between encrypted values include additively homomorphic encryption schemes and BGN-like encryption schemes.

In another embodiment of the tools and techniques, representations of coefficients of an evaluation polynomial, share representations, and encrypted representations of Lagrangian coefficients can be received. Additionally, a map-reduce operation can be performed in a computer cluster. The map-reduce operation can include, for each share representation, performing an evaluation of the evaluation polynomial on the share using the share representation and the representations of the coefficients of the evaluation polynomial to produce a share evaluation result. Additionally, the map-reduce operation can include, for each share representation, performing a multiplication operation using the share evaluation result and a set of the encrypted representations of the Lagrangian coefficients corresponding to the share. The multiplication operation can produce a multiplication result. Moreover, the map-reduce operation can include producing map-reduce results using the multiplication result for each of the shares This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved delegation of polynomial evaluations to remote computing environments to privacy features for such delegation. Such improvements may result from the use of various techniques and tools separately or in combination.

Such techniques and tools may include delegation of the evaluation of a univariate polynomial or a multivariate polynomial on data values in a dataset. For example, the evaluation may be delegated to a remote computing environment such as a map-reduce cluster. The delegation can be made private by obscuring information that is sent to the map-reduce cluster, but still providing enough information for the map-reduce cluster to perform at least a portion of the polynomial evaluation. For example, secret sharing shares of data values or sets of values may be sent to the cluster instead of the data values/sets themselves. Such shares can be used along with corresponding Lagrangian coefficients (which can also be provided to the cluster) to compute an evaluation of an evaluation polynomial on the corresponding data value(s).

Lagrangian coefficients $L_\alpha(x)$ are defined herein as follows. If p is a univariate polynomial of degree d over a field F, then p can be written as in the following equation.

$$p(x) = \sum_{\alpha \in S} p(\alpha) \cdot L_\alpha(x) \qquad \text{Equation 1}$$

In the above equation, S is an arbitrary subset of evaluation point values from F of size d+1, $\alpha \in S$ indicates the value(s) $\alpha$ in the subset S, and $L_\alpha(x)$ is the Lagrangian coefficient for the evaluation point $\alpha$ evaluated on the variable x. $L_\alpha(x)$ is defined as illustrated in the equation below.

$$L_\alpha(x) = \prod_{\substack{i \in S, \\ i \neq \alpha}} \frac{(x-i)}{(\alpha-i)} \qquad \text{Equation 2}$$

In the equation above, $i \in S$, $i \neq \alpha$ indicates the values i in the subset S other than $\alpha$.

Lagrangian coefficients may be encrypted, and the encrypted Lagrangian coefficient representations may be sent to the cluster. Representations of coefficients of the evaluation polynomial can also be sent to the cluster, and those representations may also be encrypted in some implementations. For example, the Lagrangian coefficient representations and the evaluation coefficient representations may be encrypted using an encryption scheme that provides for addition operations between encrypted values to allow the cluster to perform operations on the encrypted values to yield results that are also encrypted. Other techniques may also be used. For example, noise vectors may be mixed with share representations (which may also be vectors) so that a cluster cannot distinguish between the noise vectors and the share representations themselves.

Accordingly, evaluation of polynomials may be delegated to a remote computing environment such as a map-reduce computer cluster while retaining privacy of information about the data to be evaluated, the results of the polynomial evaluation, and/or the evaluation polynomial.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
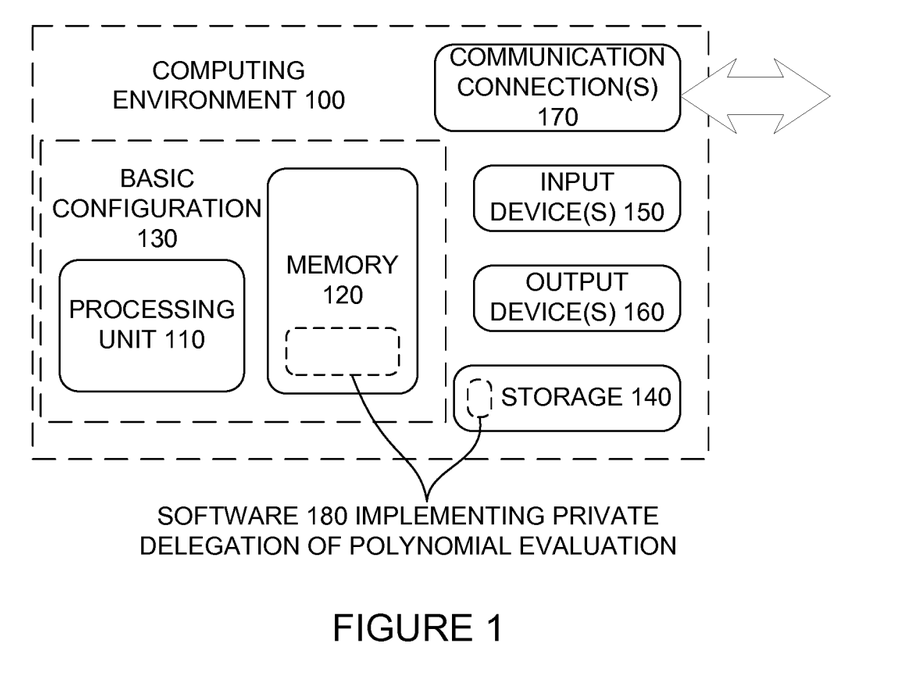
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a map-reduce client environment, as an environment in a map-reduce cluster, etc. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and at least one memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The at least one memory (120) may be volatile memory (e.g., registers, cache, RAM), non-volatile memory (e.g., ROM, EEPROM, flash memory), or some combination of the two. The at least one memory (120) stores software (180) implementing private delegation of polynomial evaluation.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Private Map-Reduce Delegation Environment

Figure 2:
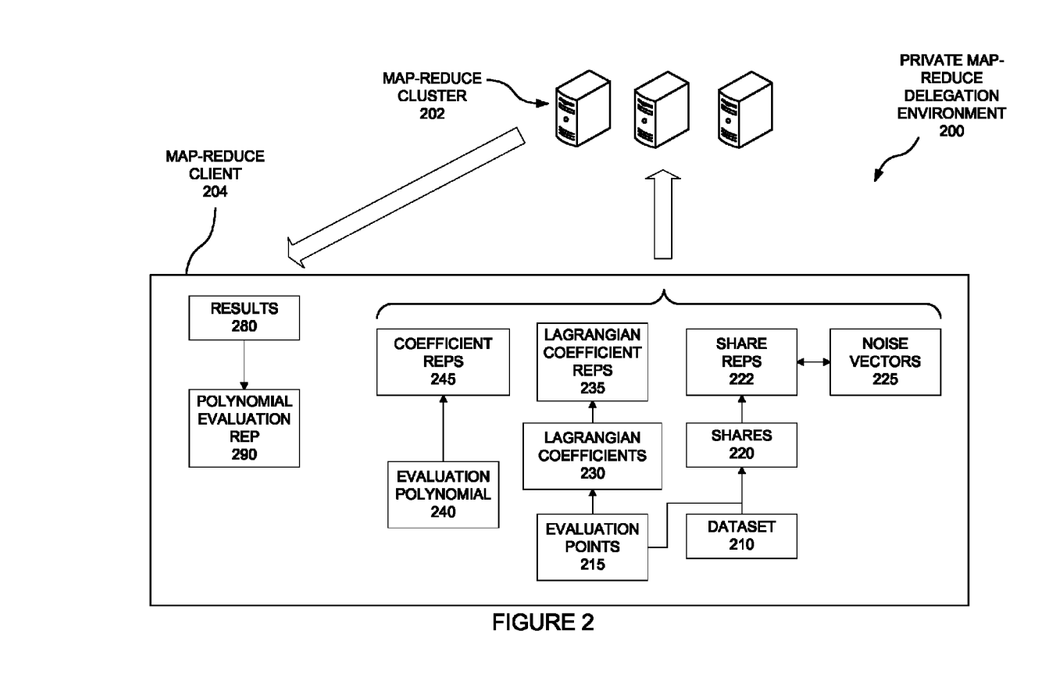
FIG. 2 is schematic diagram of a private map-reduce delegation environment.

FIG. 2 is a schematic diagram of a private map-reduce delegation environment (200) in conjunction with which one or more of the described embodiments may be implemented. The environment (200) can include a remote computing environment such as a map-reduce cluster (202) and a client such as a map-reduce client (204). The map-reduce client (204) can delegate the processing of data to the map-reduce cluster (202). However, the map-reduce client (204) can obscure the data in a way that can hide information about the data from the map-reduce cluster (202), while still allowing the map-reduce cluster (202) to perform the delegated processing of the data. The map-reduce client (204) may also perform some processing of data received back from the map-reduce cluster (202) to de-obscure the data.

In delegating polynomial evaluation, the client (204) can take a dataset (210) and a set of evaluation points to produce shares (220) for data items (values or sets of values) in the dataset (210) according to a secret sharing scheme. The client can generate share representations (222) from the shares (220). In some implementations, those share representations (222) may be mixed with noise information such as noise vectors (225). The client (204) can also use the evaluation points (215) to generate Lagrangian coefficients (230), which can be used to generate Lagrangian coefficient representations (235). For example, the Lagrangian coefficient representations may be encrypted using an encryption scheme that provides for addition operations between encrypted values.

The client (204) can also take an evaluation polynomial (240) to be evaluated over the dataset (210) and produce coefficient representations (245). For example, in some implementations the coefficient representations (245) may be encrypted using the same encryption scheme used to encrypt the Lagrangian coefficient representations (235). The client (204) can delegate evaluation of the evaluation polynomial (240) over the dataset (210) by sending the coefficient representations (245), the Lagrangian coefficient representations (235), the share representations (222), and possibly also the noise vectors (225) to the map-reduce cluster (202). The client (204) may also send to the map-reduce cluster (202) instructions to be executed in processing the information sent by the client (204). For example, the instructions may be a map-reduce program or instructions to run a map-reduce program. The map-reduce cluster (202) can return results (280) from the processing, and the client (204) can process those results (280) to produce a polynomial evaluation representation (290), which can be a data structure that represents the evaluation of the evaluation polynomial (240) on the dataset (210).

An example of techniques and tools for private delegation of univariate polynomial evaluation will now be described, followed by an example of tools and techniques for private delegate of multivariate polynomial evaluation.

A. Private Delegation of Univariate Polynomial Evaluation

A map-reduce delegation scheme for evaluating a private polynomial Q of degree q on a private dataset D will now be discussed. This implementation can utilize Shamir secret sharing, along with an encryption scheme that provides for addition operations between encrypted values, such as a BGN-like encryption scheme, to keep the polynomial Q and the dataset D private. In this implementation, the evaluation of Q can be submitted to a remote computing environment, which can be a map-reduce cluster, for parallel evaluation in a private manner. For example, a client can generate a set of evaluation points $\alpha_0, \ldots, \alpha_{dq+1}$ as random values from a domain. The client can also generate a univariate secret sharing polynomial p of degree d, such that the evaluation of the secret sharing polynomial p over an initial evaluation point $\alpha_0$ is equal to a corresponding value x from the dataset D, i.e., $p(\alpha_0)=x$. The client can evaluate the secret sharing polynomial p on each evaluation point $\alpha_j$ subsequent to the initial evaluation point $\alpha_0$ to generate shares $p(\alpha_1), \ldots, p(\alpha_{dq+1})$. Additionally, Lagrangian coefficients $L_{\alpha_j}(\alpha_0)$ evaluated on the initial evaluation point $\alpha_0$ can be generated for each evaluation point $\alpha_j$ subsequent to the initial evaluation point $\alpha_0$. Using this generated information, the evaluation polynomial Q can be evaluated on a corresponding value x from the dataset D according to the equation below.

$$Q(x) = \sum_{j=1}^{dq+1} Q(p(\alpha_j)) \cdot L_{\alpha_j}(\alpha_0) \qquad \text{Equation 3}$$

To evaluate Q, the client can compute the shares $p(\alpha_1), \ldots, p(\alpha_{dq+1})$ and Lagrangian coefficients $L_{\alpha_j}(\alpha_0)$ for each value x in the dataset D, and can delegate the rest of the evaluation of Q(x) for the dataset values to a map-reduce cluster.

If the secret sharing polynomial p and the evaluation points $\alpha_0, \ldots, \alpha_{dq+1}$ are unknown to the map-reduce cluster, then submission of representations of the shares may be done without revealing information about the underlying data value x. To enable the map-reduce cluster to perform the evaluation without learning information about either Q or the evaluation points, the client can encrypt the coefficients of Q and the Lagrangian coefficients to produce encrypted representations of those coefficients. These coefficients can be encrypted using an encryption scheme that provides for addition operations between encrypted values and that provides for multiplication operations to be performed between multiple encrypted values and between encrypted values and non-encrypted values. For example, this may be done with a BGN or BGN-like encryption scheme, which provides for multiplication operations to be performed between encrypted values to yield products that are themselves encrypted values (though such schemes do not currently provide for multiplication operations between such products and other encrypted values under the scheme). Given the encryptions described above as well as representations of the shares, addition and multiplication operations of the encryption scheme can be used by the map-reduce cluster to compute an encryption that represents the evaluation of Q(x).

A description of this implementation using a map-reduce cluster will now be given. This implementation can use a private-key BGN encryption scheme for encryption. Given a dataset $D=(x_1, \ldots, x_n)$, for each $x_i$, the representations of the shares and the encrypted coefficients of the Lagrangian coefficients can be generated by a client during a pre-processing phase. Such share and Lagrangian coefficient representations can serve as an encoding of the dataset D. In one implementation, the polynomial degree d of the secret sharing polynomial can be set to a value of 2. The client can also encode an evaluation polynomial Q, such as by encrypting the polynomial coefficients.

A parse operation at the map-reduce cluster can take the encodings of Q and D received from the client. For each data value $x_i$ the parse operation can output 2q+1 input pairs $(l_{i,1}, v_{i,1})$ through $(l_{i,2q+1}, v_{i,2q+1})$, where the label is given by $l_{i,j}=i$, and the value $v_{i,j}$ includes the encoding of Q (the encryption of the coefficients of Q), a share $s_{i,j}$ of $x_i$, and an encryption of the corresponding Lagrangian coefficient $L_s$ for the share $s_{i,j}$.

The map operation on each input pair can use the share s, the encoding of Q and the encryption of the Lagrangian coefficient $L_s$ corresponding to s to compute an encryption of $Q(s) \cdot L_s$ using the multiplication and summation operations of the BGN encryption scheme. Each mapper can output a single intermediate pair $(i, \gamma)$, where $\gamma$ is an encryption of $Q(s) \cdot L_s$ according to the BGN encryption scheme. A shuffle operation can partition the $\gamma$'s such that each reducer receives the $\gamma$'s for a particular $x_i$. Each reducer can sum the $\gamma$'s in its partition using the summation operation of the BGN encryption scheme to generate an output value z that is an encryption of $Q(x_i)$. Each reducer can output a pair $(i,z)$, and the $(i,z)$ pairs can be returned to the client as the map-reduce results. The client can decrypt the z values according to the BGN encryption scheme using the client's key that was used to encrypt the values in the pre-processing phase to generate decrypted values $(y_1, \ldots, y_n)$ that are polynomial evaluation representations of the evaluations $(Q(x_i), \ldots, Q(x_n))$. Thus, the client can perform some pre-processing and some post-processing, but delegate the core computation of the univariate polynomial evaluation to a map-reduce cluster, while keeping the evaluation polynomial, the dataset, and the results private.

B. Private Delegation of Multivariate Polynomial Evaluation

The client may delegate the evaluation of a public multivariate polynomial Q of degree q on a private dataset D having values one or more multi-variable sets $(x_1, \ldots, x_m)$, where m is the number of variables in the polynomial Q. Shamir secret sharing and an encryption scheme that provides for addition operations between encrypted values may be used to keep the dataset private. An encryption scheme that provides for addition operations between encrypted values may be used in this implementation whether or not it provides for a multiplication operation between encrypted values. For example, the encryption scheme may be an additively homomorphic encryption scheme such as the Pailler scheme, the Benaloh scheme, or some other additively homomorphic encryption scheme. A client can generate a set of evaluation points $\alpha_0, \ldots, \alpha_{dq+1}$ as random values from a domain. The client can also generate univariate secret sharing polynomials $p_1$ through $p_m$ of degree d, such that the evaluation of each secret sharing polynomial $p_l$ over an initial evaluation point $\alpha_0$ is equal to a corresponding value $x_l$ from the dataset D, i.e., $p_l(\alpha_0)=x_l$ (for $1 \le l \le m$). The client can evaluate the secret sharing polynomials $p_1$ through $p_m$ on each evaluation point $\alpha_j$ subsequent to the initial evaluation point $\alpha_0$ (which may be zero) to generate share representations that are vectors, where the jth share representation for from the jth evaluation point $\alpha_j$ is a vector $\{p_1(\alpha_j), \ldots, p_m(\alpha_j)\}_j$. The client can also generate Lagrangian coefficients $L_{\alpha_j}(\alpha_0)$ for each evaluation point $\alpha_j$ subsequent to the initial evaluation point $\alpha_0$. Using this generated information, the evaluation polynomial Q can be evaluated on a corresponding set of values $(x_1, \ldots, x_m)$ from the dataset D according to the equation below.

$$Q(x_1, \ldots, x_m) = \sum_{j=1}^{dq+1} Q(p_1(\alpha_j), \ldots, p_m(\alpha_j)) \cdot L_{\alpha_j}(\alpha_0) \qquad \text{Equation 4}$$

To evaluate Q, the client can compute the shares $\{p_1(\alpha_j), \ldots, p_m(\alpha_j)\}_j$, and the Lagrangian coefficients $L_{\alpha_j}(\alpha_0)$ for each set of values $(x_1, \ldots, x_m)$ in the dataset D, and can delegate to the map-reduce cluster the evaluation of $Q(p_1(\alpha_j), \ldots, p_m(\alpha_j)) \cdot L_{\alpha_j}(\alpha_0)$ to produce results $\mu_j$. To allow the map-reduce cluster to perform the evaluation without learning information about D, the client can encrypt the Lagrangian coefficients using an encryption scheme that provides for addition operations between encrypted values and randomly intermix noise vectors with the vectors that represent the shares. The number of noise vectors can be arrived at by balancing the increased security by introducing additional noise vectors on the one hand and the decreased performance from using such additional noise vectors on the other hand. Accordingly, the number of noise vectors to be used can depend on the parameters of the system and on the level of security to be achieved. Given the public polynomial Q, the shares $\{p_1(\alpha_j), \ldots, p_m(\alpha_j)\}_j$, and the encrypted Lagrangian coefficients, addition and multiplication operations of the encryption scheme can be used by the map-reduce cluster to compute an encrypted representation of each $\mu_j$ and return it to the client. Appropriate information can be embedded in the labels of the input and intermediate pairs to allow the client to distinguish the $\mu_j$'s resulting from noise, or fake, vectors from the "real" or "good" ones resulting from real shares. The client can use the $\mu_j$'s to evaluate Q by decrypting the "real" $\mu_j$'s and computing their sum during a decoding phase.

A description of this implementation using a map-reduce cluster will now be given. This implementation can use a private-key encryption scheme ("SKE"), an additively homomorphic encryption scheme ("AHE") and Shamir secret sharing. The multivariate polynomial can be evaluated on a dataset D with data vectors $(x_1, \ldots, x_n)$ each having a set of data values. The pre-processing phase can generate 2q+1+w (where w is the number of noise vectors) input pairs $(l_{i,j}, v_{i,j})_j$ for each $x_i$ (d can be set to 2 here), where $v_{i,j}$ can be a set of synchronized shares $p_1(\alpha_j), \ldots, p_m(\alpha_j)$ if j is not a noise vector and $v_{i,j}$ is a sequence of random values if j is a noise vector. The labels $l_{i,j}$ can include an encryption of i (indicating which data element the shares are associated with) concatenated with a bit b (which indicates whether the associated vector is real or noisy), and the encryption of the appropriate Lagrangian coefficient. Accordingly, the label $l_{i,j}$ can be illustrated as in the equation below.

$$l_{i,j} = \text{SKE.Enc}_{K_1}(i \| b) \| \text{AHE.Enc}_{K_2}(L_{\alpha_j}(\alpha_0)) \qquad \text{Equation 5}$$

In the equation above, SKE. $\text{Enc}_{K_1}()$ indicates an encryption under the private-key encryption scheme SKE using key $K_1$, $\text{AHE.Enc}_{K_2}()$ indicates an encryption under the additively homomorphic encryption scheme using key $K_2$, and the operator $\|$ indicates concatenation.

A map operation can take an input pair (l,v) and compute an intermediate value $\gamma$ by evaluating Q(v) and performing a multiplication operation of Q(v) and the encryption of $L_{\alpha_j}(\alpha_0)$ according to the additively homomorphic encryption scheme. Each such map operation can output a single intermediate pair ($\text{Enc}_{K_1}(i\|b), \gamma$).

The parse operation can be an identity function (which can simply pass on its inputs as outputs), and the partition operation can be a default shuffle operation. The reduce operation can be the identity function as well, producing reduce outputs ($\text{Enc}_{K_1}(i\|b), P$). The encryption scheme SKE in this implementation is probabilistic so that every intermediate label can be different. Accordingly, the result of the shuffle operation can be that the partition P is a singleton set of the form $\text{Enc}_{K_2}(Q(v) \cdot L_{\alpha_j}(\alpha_0))$ for some j.

As noted above, there are a total of n·(2q+1+w) input pairs $(l_{i,j}, v_{i,j})_{i,j}$, so the decoding phase on the client can receive that same number of output pairs $(\lambda_t, z_t)_t$, where $\lambda_t = (\text{Enc}_{K_1}(i\|b)$ and $z_t = P_t = \text{Enc}_{K_2}(Q(v) \cdot L_{\alpha_j}(\alpha_0))$ for some i in the set up to [n] and some j in the set up to [2q+1+w]. The output pairs $(\lambda_t, z_t)_t$ may not be guaranteed to arrive in order, so the client may not initially know which $z_t$'s to use to recover a particular output $Q(x_i)$, and some of the output pairs can be the result of evaluating Q on a noise vector. Such issues can be resolved by the client decrypting $\lambda_t$ and recovering $i_t\|b_t$. The value $b_t$ can be used to determine whether the corresponding $z_t$ results from a real or noise vector, and $i_t$ can be used to determine the $x_i$ to which the $z_t$ corresponds. Accordingly, the client can decode and sum the $z_t$ values for a set of data values forming a data vector $x_i$ to recover a representation of the polynomial evaluation $Q(x_i)$.

III. Techniques for Private Delegation of Polynomial Evaluation

Several techniques for private delegation of polynomial evaluation will now be discussed. Each of these techniques can be performed in a computing environment. For example, each technique may be performed in a computer system that includes at least one processor and at least one memory including instructions stored thereon that when executed by the at least one processor cause the at least one processor to perform the technique (one or more memories store instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
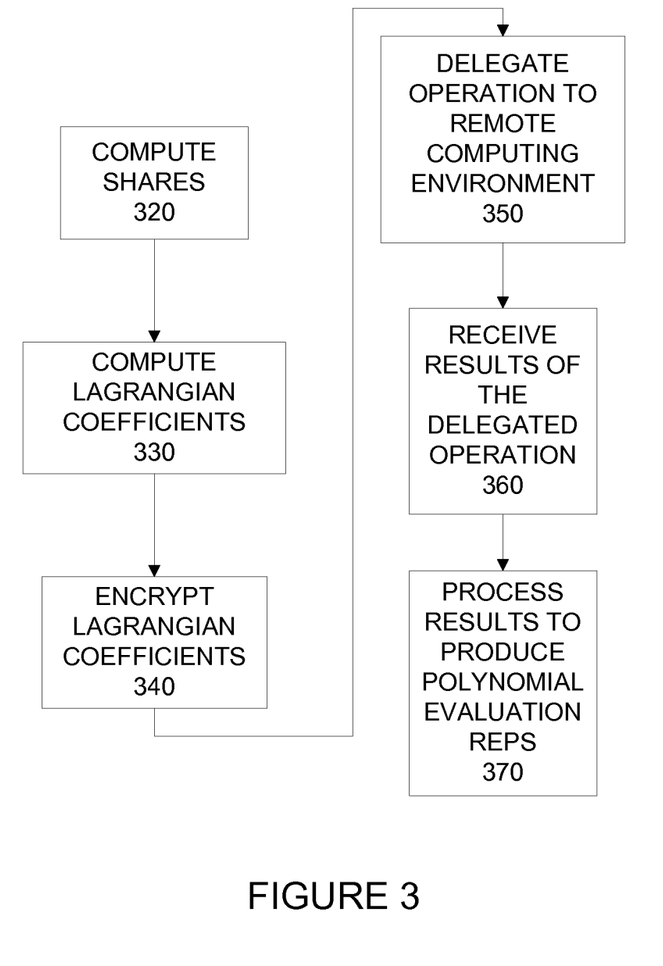
FIG. 3 is a flowchart of a technique for private delegation of polynomial evaluation.

Referring to FIG. 3, a technique for private delegation of polynomial evaluation will be described. The technique can include computing (320) shares for one or more data values in a dataset using multiple evaluation point values and one or more secret sharing polynomials. The evaluation point values can include an initial evaluation point value and one or more subsequent evaluation point values. Lagrangian coefficients can be computed (330) for each of the subsequent evaluation point value(s) evaluated on the initial evaluation point value. The shares and the Lagrangian coefficients may be used to evaluate polynomials on the data values. The technique can also include encrypting (340) the Lagrangian coefficients according to an encryption scheme that provides for addition operations between encrypted values to produce encrypted representations of the Lagrangian coefficients. An operation on representations of coefficients of an evaluation polynomial, representations of the shares, and the encrypted representations of the Lagrangian coefficients can be delegated (350) to a remote computing environment (e.g., to a remote computer cluster such as a map-reduce cluster). Results of the delegated operation can be received (360) from the remote computing environment, and the results can be processed to produce one or more representations of evaluation(s) of the polynomial on the data value(s).

The evaluation polynomial may be a univariate polynomial. The encryption scheme that provides for addition operations between encrypted values can also provide for a multiplication operation between encrypted values, and the representations of coefficients of the evaluation polynomial can be encrypted according to the scheme. In this situation, the results of the operation can include one or more encrypted result values that are each an encryption of a final result of evaluating the evaluation polynomial on one of the data value(s). Additionally, processing (370) the results may include decrypting the encrypted result value(s).

The evaluation polynomial may be a multivariate polynomial, and the data value(s) can include one or more data vectors that each represent a set of polynomial variable values. The secret sharing polynomial(s) can include multiple secret sharing polynomials, and each of the representations of the shares can be a share vector representing multiple share values. Each share vector can include a set of share values that are computed using one of the evaluation point values. Additionally, each share vector can include different share values computed using different secret sharing polynomials.

The representations of the shares can be mixed with noise information. For example, where the share representations are share vectors, the noise can include one or more noise vectors. Processing (370) the results can include distinguishing between noise-generated values and share-generated values and performing operations on the share-generated values without performing those operations on the noise-generated values. For example, processing (370) the results can include distinguishing between one or more values from the results that were generated from the representations of the shares and one or more values from the results that were generated from noise vectors. Additionally, processing (370) the results can also include performing operation(s) on the values generated from the representations of the shares without performing those operation(s) on the values generated from the noise vectors.

Processing (370) the results may include, for each of the data vector(s) discussed above, grouping a set of values from the results that were generated from the representation of the shares for that data vector and performing a summation operation on the set of values. The results may include a set of encoded result values that include an encoding of a product of a Lagrangian coefficient and an evaluation of the evaluation polynomial on a share vector. Additionally, processing (370) the results can include performing a summation operation using the encoded result values corresponding to each data vector of the one or more data vectors.

Figure 4:
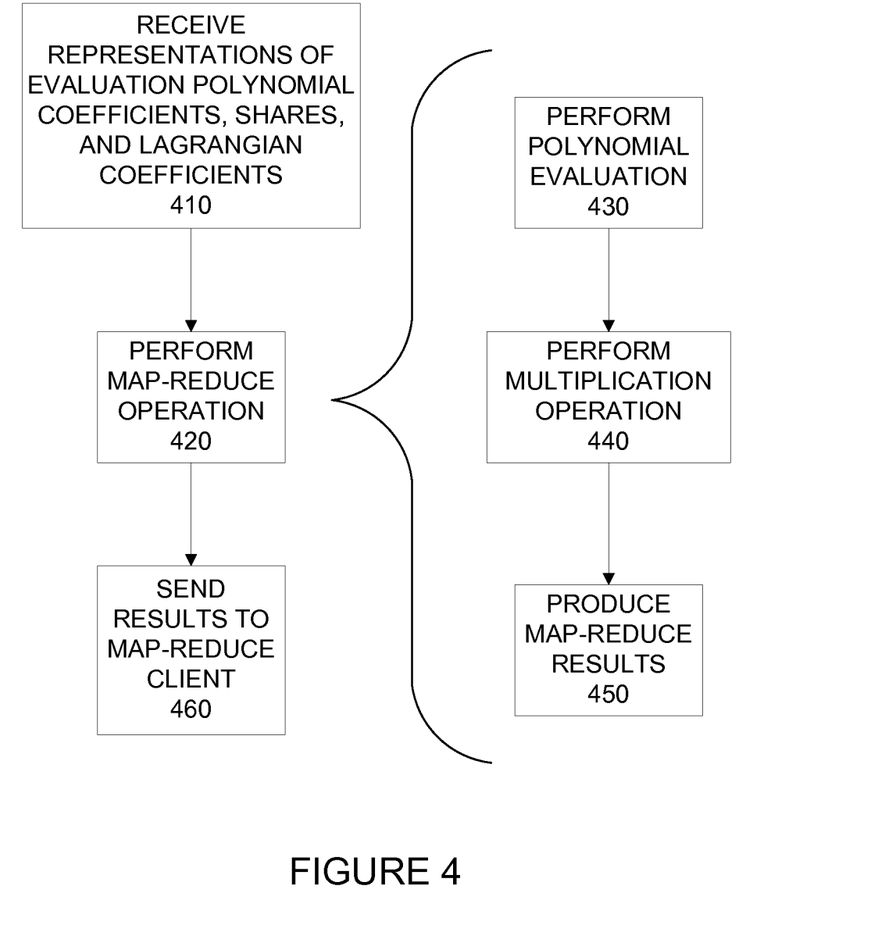
FIG. 4 is a flowchart of another technique for private delegation of polynomial evaluation.

Referring to FIG. 4, another technique for private delegation of polynomial evaluation will be described. The technique can include receiving (410) representations of coefficients of an evaluation polynomial, share representations, and encrypted representations of Lagrangian coefficients. Additionally, a map-reduce operation can be performed (420) in a computer cluster. The map-reduce operation can include, for each share representation, performing (430) an evaluation of the evaluation polynomial on the share using the share representation and the representations of the coefficients of the evaluation polynomial to produce a share evaluation result. Additionally, the map-reduce operation can include, for each share representation, performing (440) a multiplication operation using the share evaluation result and a set of the encrypted representations of the Lagrangian coefficients corresponding to the share. The multiplication operation can produce a multiplication result. Moreover, the map-reduce operation can include producing (450) map-reduce results using the multiplication result for each of the shares.

The evaluation polynomial may be a univariate polynomial and producing the map-reduce results can include performing a summation operation according to an encryption scheme that provides for addition operations between encrypted values. The summation operation can include summing multiplication results for a set of share representations to produce the map-reduce results. Each share evaluation result can be encrypted according to an encryption scheme that provides for addition operations between encrypted values, and the multiplication operation may include a multiplication operation of a set of encrypted values according to that encryption scheme. The multiplication result for each of the share representations can be encrypted according to the encryption scheme that provides for addition operations between encrypted values.

Performing (430) the evaluation of the evaluation polynomial and performing (440) the multiplication operation can both be part of a mapping operation. Additionally, the map-reduce operation can include a reduce operation that includes performing a summation operation on results from the mapping operation.

The evaluation polynomial can be a multivariate polynomial, and the share representations can be vectors. Noise vectors can be mixed with the share representations and processed along with the share representations in the map-reduce operation. The map-reduce results can include a representation of each multiplication result, and the technique can further include sending (460) the map-reduce results to a map-reduce client.

Figure 5:
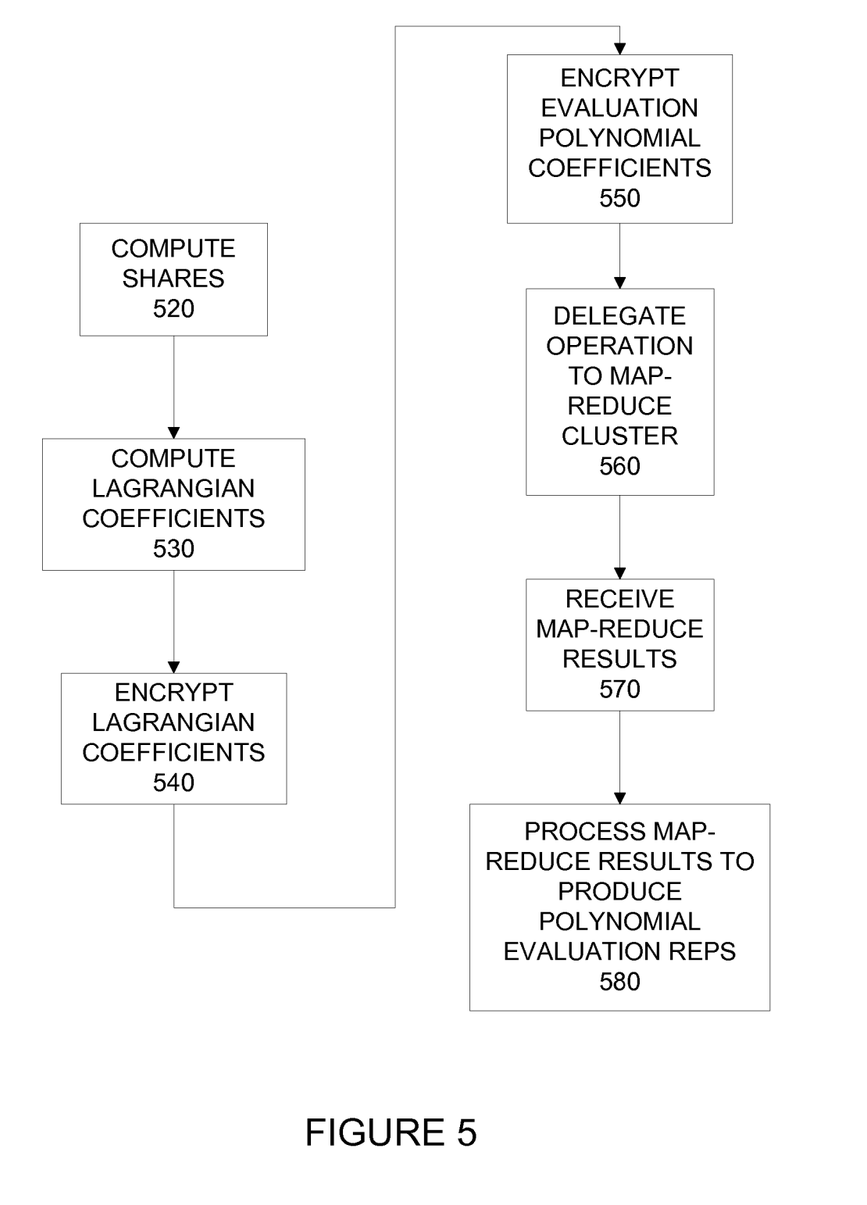
FIG. 5 is a flowchart of yet another technique for private delegation of polynomial evaluation.

Referring to FIG. 5, yet another technique for private delegation of polynomial evaluation will be described. The technique can include computing (520) shares for each of one or more data values in a dataset using multiple evaluation point values and a secret sharing polynomial. The evaluation point values can include an initial evaluation point value and one or more subsequent evaluation point values, such that an evaluation of the secret sharing polynomial on the initial evaluation point value yields a corresponding data value from the dataset. The technique can also include computing (530) Lagrangian coefficients for each of the one or more subsequent evaluation point values evaluated on the initial evaluation point value, such that the shares and the Lagrangian coefficients can be used along with a representation of a univariate evaluation polynomial to evaluate the evaluation polynomial on the data values. Additionally, the technique can include encrypting (540) the Lagrangian coefficients according to an encryption scheme that provides for addition operations between encrypted values to produce encrypted representations of the Lagrangian coefficients. The encryption scheme that provides for addition operations between encrypted values can also provide for a multiplication operation between encrypted values. Coefficients of the evaluation polynomial can also be encrypted (550) according to the encryption scheme that provides for addition operations between encrypted values to form encrypted representations of the coefficients of the evaluation polynomial.

An operation on the encrypted representations of the coefficients of the evaluation polynomial, representations of the shares, and the encrypted representations of the Lagrangian coefficients can be delegated (560) to a map-reduce cluster. The delegation (560) can include providing computer-executable instructions to the map-reduce cluster that when executed by the map-reduce cluster perform a map-reduce operation that includes a mapping operation and a reducing operation. The mapping operation can include evaluating the encrypted representations of the coefficients of the evaluation polynomial on the representations of the shares to produce evaluation results, and performing multiplication operations on the evaluation results and the encrypted representations of the Lagrangian coefficients. The reducing operation can include summing sets of results of the multiplication operations that each correspond to a data value from the dataset to produce map-reduce results. The map-reduce results can be received (570) from the map-reduce cluster and processed (580) to produce one or more representations of one or more evaluations of the polynomial on the one or more data values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    computing shares for one or more data values in a dataset using multiple evaluation point values and one or more secret sharing polynomials, the evaluation point values comprising an initial evaluation point value and one or more subsequent evaluation point values;
    computing Lagrangian coefficients for each of the one or more subsequent evaluation point values evaluated on the initial evaluation point value, such that the shares and the Lagrangian coefficients can be used to evaluate polynomials on the one or more data values;
    encrypting the Lagrangian coefficients according to an encryption scheme that provides for addition operations between encrypted values to produce encrypted representations of the Lagrangian coefficients;
    delegating to a remote computing environment an operation on representations of coefficients of an evaluation polynomial, representations of the shares, and the encrypted representations of the Lagrangian coefficients;
    receiving results of the operation from the remote computing environment; and
    processing the results to produce one or more representations of one or more evaluations of the evaluation polynomial on the one or more data values.

2. The method of claim 1, wherein the remote computing environment is a map-reduce cluster.

3. The method of claim 1, wherein the evaluation polynomial is a univariate polynomial.

4. The method of claim 3, wherein the encryption scheme that provides for addition operations between encrypted values also provides for a multiplication operation between encrypted values, and wherein the delegated operation includes multiplication using one or more encrypted values according to the encryption scheme and addition using one or more encrypted values according to the encryption scheme.

5. The method of claim 4, wherein the representations of coefficients of the evaluation polynomial are encrypted according to the encryption scheme that provides for addition operations between encrypted values.

6. The method of claim 5, wherein the results of the operation comprise one or more encrypted result values, wherein each of the one or more encrypted result values is an encryption of a final result of evaluating the evaluation polynomial on one of the one or more data values, and wherein processing the results comprises decrypting the one or more encrypted result values.

7. The method of claim 1, wherein the evaluation polynomial is a multivariate polynomial, wherein the one or more data values comprise one or more data vectors, and wherein each of the one or more data vectors represents a set of polynomial variable values.

8. The method of claim 7, wherein the one or more secret sharing polynomials comprise multiple secret sharing polynomials and each of the representations of the shares is a share vector representing multiple share values, wherein each share vector comprises a set of share values that are computed using one of the evaluation point values, and wherein each share vector comprises different share values computed using different secret sharing polynomials.

9. The method of claim 8, wherein the representations of the shares are mixed with one or more noise vectors, and wherein processing the results comprises:
    distinguishing between one or more values from the results that were generated from the representations of the shares and one or more values from the results that were generated from the noise vectors; and
    performing one or more operations on the values generated from the representations of the shares without performing the one or more operations on the values generated from the noise vectors.

10. The method of claim 9, wherein, for each of the one or more data vectors, processing the results comprises:
    grouping a set of values from the results that were generated from the representation of the shares for that data vector; and
    performing a summation operation on the set of the values.

11. The method of claim 8, wherein:
    the results of the operation comprise a set of encoded result values comprising an encoding of a multiplication product of a Lagrangian coefficient and an evaluation of the evaluation polynomial on a share vector; and
    processing the results comprises performing a summation operation using the encoded result values corresponding to each data vector of the one or more data vectors.

12. A computer system comprising:
    at least one processor; and
    at least one memory comprising instructions stored thereon that when executed by the at least one processor cause the at least one processor to perform acts comprising:
        a server system in the computer system receiving representations of coefficients of an evaluation polynomial, share representations, and encrypted representations of Lagrangian coefficients;

the server system performing a polynomial evaluation operation, the polynomial evaluation operation comprising:

for each share representation, performing an evaluation of the evaluation polynomial on the share using the share representation and the representations of the coefficients of the evaluation polynomial to produce a share evaluation result;

for each share representation, performing a multiplication operation using the share evaluation result and a set of the encrypted representations of the Lagrangian coefficients corresponding to the share, the multiplication operation producing a multiplication result, the multiplication result for each share representation comprising an encrypted value that can be decrypted to produce a decrypted result that represents a result of an operation comprising multiplying non-encrypted representations of the Lagrangian coefficients corresponding to the share with the non-encrypted share evaluation result corresponding to the share; and producing polynomial evaluation results using the multiplication result for each of the share representations.

13. The computer system of claim 12, wherein the evaluation polynomial is a univariate polynomial and wherein producing the polynomial evaluation results comprises performing a summation operation according to an encryption scheme that provides for addition operations between encrypted values, the summation operation summing multiplication results for a set of share representations to produce the polynomial evaluation results.

14. The computer system of claim 13, wherein each share evaluation result is encrypted according to the encryption scheme that provides for addition operations between encrypted values, wherein the multiplication operation comprises a multiplication operation of a set of encrypted values according to the encryption scheme that provides for addition operations between encrypted values, and wherein the multiplication result for each of the share representations is encrypted according to the encryption scheme that provides for addition operations between encrypted values.

15. The computer system of claim 12, wherein polynomial evaluation comprises a map-reduce operation, and wherein performing the evaluation of the evaluation polynomial and performing the multiplication operation are both part of a mapping operation.

16. The computer system of claim 15, wherein the map-reduce operation comprises a reduce operation that comprises performing a summation operation on results from the mapping operation.

17. The computer system of claim 12, wherein the evaluation polynomial is a multivariate polynomial.

18. The computer system of claim 17, wherein the share representations are vectors, and wherein noise vectors are mixed with the share representations and are processed along with the share representations in the polynomial evaluation operation.

19. The computer system of claim 17, wherein the polynomial evaluation results comprise a representation of each multiplication result, and wherein the acts further comprise sending the polynomial evaluation results to a client.

20. One or more computer-readable storage media, which are not signals per se, having computer-executable instructions embodied thereon that, when executed by at least one processor, cause the at least one processor to perform acts comprising:

computing shares for each of one or more data values in a dataset using multiple evaluation point values and a secret sharing polynomial, the evaluation point values comprising an initial evaluation point value and one or more subsequent evaluation point values, such that an evaluation of the secret sharing polynomial on the initial evaluation point value yields a corresponding data value from the dataset;

computing Lagrangian coefficients for each of the one or more subsequent evaluation point values evaluated on the initial evaluation point value, such that the shares and the Lagrangian coefficients can be used along with a representation of a univariate evaluation polynomial to evaluate the evaluation polynomial on the one or more data values;

encrypting the Lagrangian coefficients according to an encryption scheme that provides for addition operations between encrypted values to produce encrypted representations of the Lagrangian coefficients, the encryption scheme that provides for addition operations between encrypted values also providing for a multiplication operation between encrypted values;

encrypting coefficients of the evaluation polynomial according to the encryption scheme that provides for addition operations between encrypted values to form encrypted representations of the coefficients of the evaluation polynomial;

delegating to a map-reduce cluster an operation on the encrypted representations of the coefficients of the evaluation polynomial, representations of the shares, and the encrypted representations of the Lagrangian coefficients, the delegation comprising providing computer-executable instructions to the map-reduce cluster that when executed by the map-reduce cluster perform a map-reduce operation that comprises:

a mapping operation that includes evaluating the encrypted representations of the coefficients of the evaluation polynomial on the representations of the shares to produce evaluation results, and performing multiplication operations on the evaluation results and the encrypted representations of the Lagrangian coefficients; and a reducing operation that includes summing sets of results of the multiplication operations that each corresponds to a data value from the dataset to produce map-reduce results;

receiving the map-reduce results from the map-reduce cluster; and processing map-reduce results to produce one or more representations of one or more evaluations of the evaluation polynomial on the one or more data values.

* * * * *